(12) United States Patent
Kuroyanagi et al.

(10) Patent No.: US 10,998,786 B2
(45) Date of Patent: May 4, 2021

(54) STATOR AND METHOD FOR MANUFACTURING STATOR

(71) Applicants: AISIN AW CO., LTD., Anjo (JP); HAYASHIKOGYOSYO CO., LTD., Nakatsugawa (JP)

(72) Inventors: Toru Kuroyanagi, Okazaki (JP); Ko Kajita, Nakatsugawa (JP); Takahiko Hobo, Nakatsugawa (JP)

(73) Assignees: AISIN AW CO., LTD., Anjo (JP); HAYASHIKOGYOSYO CO., LTD., Nakatsugawa (JP)

( * ) Notice: Subject to any disclaimer, the term of this patent is extended or adjusted under 35 U.S.C. 154(b) by 75 days.

(21) Appl. No.: 16/337,085

(22) PCT Filed: Sep. 22, 2017

(86) PCT No.: PCT/JP2017/034318
§ 371 (c)(1),
(2) Date: Mar. 27, 2019

(87) PCT Pub. No.: WO2018/079151
PCT Pub. Date: May 3, 2018

(65) Prior Publication Data
US 2019/0393748 A1    Dec. 26, 2019

(30) Foreign Application Priority Data

Oct. 31, 2016  (JP) .............................. JP2016-213400

(51) Int. Cl.
*H02K 3/12*  (2006.01)
*H02K 1/12*  (2006.01)
*H02K 15/02* (2006.01)

(52) U.S. Cl.
CPC ................. *H02K 3/12* (2013.01); *H02K 1/12* (2013.01); *H02K 15/024* (2013.01)

(58) Field of Classification Search
CPC ............ H02K 3/12; H02K 1/12; H02K 15/02; H02K 15/12; H02K 15/024; H02K 15/085; H02K 3/493; H02K 3/487
See application file for complete search history.

(56) References Cited

U.S. PATENT DOCUMENTS 4,200,818 A *  4/1980  Ruffing ................. H02K 3/487
                                                    310/214
5,982,056 A *  11/1999 Koyama ................ C08G 59/38
                                                    310/43

(Continued)

FOREIGN PATENT DOCUMENTS

CN      1111411 A      11/1995
GB      1100499 A  *   1/1968  ............. H02K 3/493

(Continued)

OTHER PUBLICATIONS

Dec. 19, 2017 International Search Report issued in International Patent Application No. PCT/JP2017/034318.

*Primary Examiner* — Naishadh N Desai
(74) *Attorney, Agent, or Firm* — Oliff PLC

(57) ABSTRACT

A stator that includes an annular stator core having a plurality of slots each having a coil insertion opening that opens in a radial direction, and recesses formed in circumferential side walls and extending in an axial direction; a coil including slot accommodated portions accommodated in the plurality of slots; and a wedge containing a thermoplastic resin and engaged with the recesses so as to close at least a part of the coil insertion opening as viewed in the radial direction of the stator core.

10 Claims, 10 Drawing Sheets

(56) References Cited

U.S. PATENT DOCUMENTS

| | | | | |
|---|---|---|---|---|
| 2009/0289520 A1* | 11/2009 | Takeshita | ............... | H02K 3/487 |
| | | | | 310/214 |
| 2010/0162560 A1* | 7/2010 | Lape | .................. | H02K 15/0006 |
| | | | | 29/764 |
| 2015/0155753 A1* | 6/2015 | Kubo | ..................... | H02K 3/487 |
| | | | | 310/214 |

FOREIGN PATENT DOCUMENTS

| | | | | |
|---|---|---|---|---|
| GB | 1140594 A * | 1/1969 | ............. | H02K 3/487 |
| JP | 67760 C2 | 3/1926 | | |
| JP | S52-88701 A | 7/1977 | | |
| JP | S53-76305 A | 7/1978 | | |
| JP | 55077341 A * | 6/1980 | | |
| JP | H01-129735 A | 5/1989 | | |
| JP | 2009-189145 A | 8/2009 | | |
| JP | 2010-154680 A | 7/2010 | | |
| JP | 2014-054067 A | 3/2014 | | |
| JP | 2015-226379 A | 12/2015 | | |
| JP | 2016-111882 A | 6/2016 | | |
| WO | WO-2019082473 A1 * | 5/2019 | ............... | H01F 5/00 |

* cited by examiner

STATOR AND METHOD FOR MANUFACTURING STATOR

BACKGROUND

The present disclosure relates to stators and methods for manufacturing a stator.

Conventionally, stators including wedges and methods for manufacturing such a stator are known in the art. Such a stator is disclosed in, e.g., Japanese Patent Application Publication No. 2015-226379 (JP 2015-226379 A).

In a method for manufacturing a stator described in Japanese Patent Application Publication No. 2015-226379 (JP 2015-226379 A), slot insulating paper is first fitted in slots of an annular stator core. Next, stator coils are inserted from the inner side in the radial direction through openings that open toward the inner side in the radial direction of the stator core. A wedge extending in the axial direction is then inserted in the axial direction into wedge grooves formed in circumferential side walls of each slot and extending in the axial direction. The wedge is placed so as to close the opening of the slot. In the circumferential direction of the stator core, the width of the wedge is greater than that of the opening of the slot as the wedge is placed in the wedge grooves.

In such a conventional method for manufacturing a stator as described in Japanese Patent Application Publication No. 2015-226379 (JP 2015-226379 A), in the case where the stator coil is accommodated up to the inner side in the radial direction in each slot in order to increase occupancy of the stator coil in the slot, the wedge may interfere with the stator coil when inserted into the wedge grooves of the slot in the axial direction, and therefore may be inserted while rubbing against the stator coil. As a solution to this problem, the wedge is conventionally inserted in the axial direction with the stator coil being compressed radially outward.

SUMMARY

However, the conventional method for manufacturing a stator in which the wedge is inserted in the axial direction with the stator coil being compressed radially outward is disadvantageous in that the stator coil is distorted (subjected to load) due to the compression. Moreover, the wedge rubs against the stator coil when inserted in the axial direction. In the case where the stator core has a relatively large axial length, the contact area between the wedge and the stator coil increases, and the frictional force between the wedge and the stator coil therefore increases accordingly. It is therefore difficult to insert the wedge into the wedge grooves (the slot) in the axial direction.

The wedge can be inserted from the inner side in the radial direction of the slot in order to reduce the friction between the wedge and the stator coil which is caused when the wedge is inserted in the axial direction. In the conventional stator, however, the width of the wedge is greater than that of the opening of the slot in the circumferential direction of the stator, and it is therefore difficult to insert the wedge into the slot through the opening on the inner side in the radial direction of the slot.

An exemplary aspect of the disclosure provides a stator and a method for manufacturing a stator in which a wedge can be easily inserted into a slot without applying load to a coil even in the case where occupancy of the coil in the slot is increased.

A stator according to a first aspect of the present disclosure includes: an annular stator core having a plurality of slots each having a coil insertion opening that opens in a radial direction, and recesses formed in a circumferential side walls and extending in an axial direction; a coil including slot accommodated portions accommodated in the plurality of slots; and a wedge containing a thermoplastic resin and engaged with the recesses so as to close at least a part of the coil insertion opening as viewed in the radial direction of the stator core.

As described above, in the stator according to the first aspect of the present disclosure, the wedge contains the thermoplastic resin. A circumferential width of the wedge can thus be changed by heating the wedge. Accordingly, by forming the wedge with a width smaller than a circumferential width of the coil insertion opening, the wedge can be inserted in the radial direction into the slot through the coil insertion opening. Moreover, during or after the insertion, the wedge is thermally deformed so that the circumferential width of the wedge becomes larger than that of the coil insertion opening, whereby the wedge can be placed in the recesses. Unlike the case where a wedge is placed in recesses by moving the wedge in the axial direction without thermally deforming the wedge, axial friction between the wedge and the coil can therefore be prevented even in the case where occupancy of the coil in the slot is increased and the stator core has a relatively large axial length. Accordingly, even in the case where occupancy of the coil in the slot is increased, the wedge can be easily placed in the recesses of the slot without applying load to the coil.

A method for manufacturing a stator according to a second aspect of the present disclosure is a method for manufacturing a stator including an annular stator core having a plurality of slots each having a coil insertion opening that opens in a radial direction, and recesses formed in a circumferential side walls and extending in an axial direction, a coil including slot accommodated portions accommodated in the plurality of slots, and a wedge placed in the recesses, including the steps of: inserting the slot accommodated portions of the coil into the plurality of slots through the coil insertion openings in the radial direction of the stator core; and after the step of inserting the coil, moving the wedge containing a thermoplastic resin from one side in the radial direction of the stator core toward the other side in the radial direction through the coil insertion opening while thermally deforming the wedge, thereby engaging the wedge with the recesses so that the wedge closes at least a part of the coil insertion opening as viewed in the radial direction of the stator core.

With the above configuration, in the method for manufacturing a stator according to the second aspect of the present disclosure, the wedge containing the thermoplastic resin is moved from the one side in the radial direction of the stator core toward the other side in the radial direction through the coil insertion opening while thermally deforming the wedge. Unlike the case where a wedge is placed in recesses by moving the wedge in the axial direction without thermally deforming the wedge, axial friction between the wedge and the coil can therefore be prevented. Accordingly, even in the case where occupancy of the coil in the slot is increased and the stator core has a relatively large axial length, an increase in frictional force between the wedge and the coil can be prevented. As a result, a method for manufacturing a stator can be provided in which a wedge can be easily placed in recesses of a slot without applying load to a coil even in the case where occupancy of the coil in the slot is increased.

As described above, according to the present disclosure, the wedge can be easily inserted into the slot without applying load to the coil even in the case where occupancy of the coil in the slot is increased.

DETAILED DESCRIPTION OF EMBODIMENTS

Figure 1:
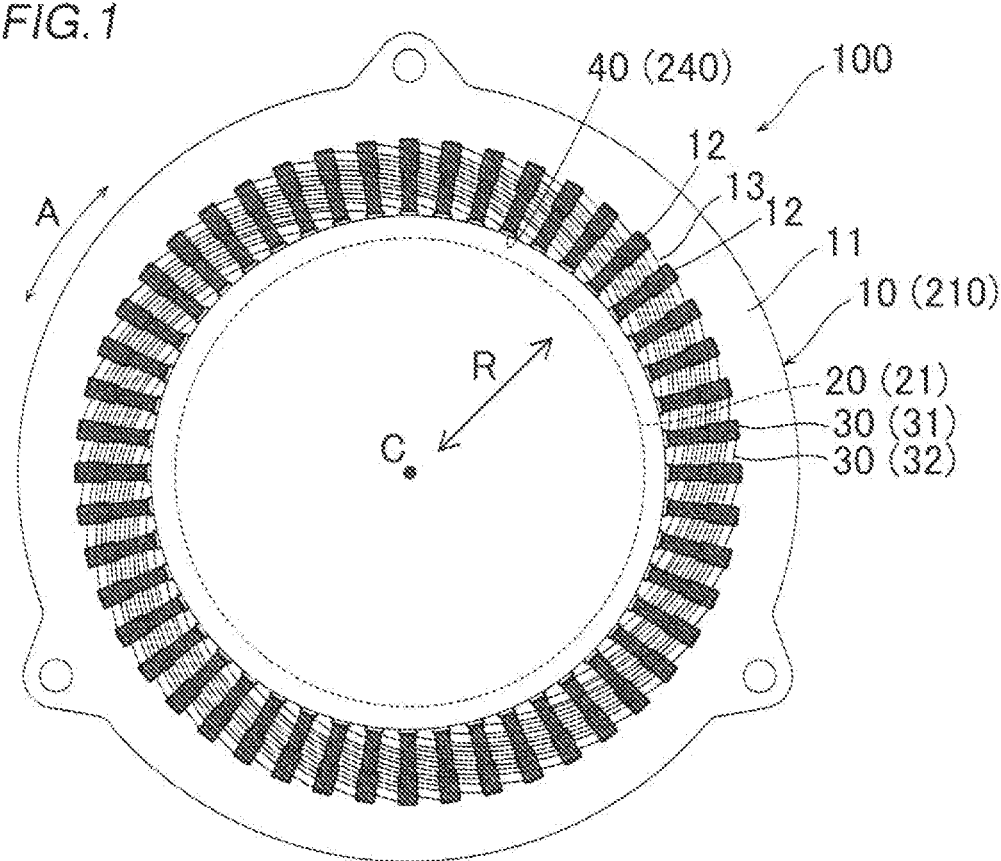
FIG. 1 is a plan view of a rotating electrical machine (stator) according to a first embodiment of the present disclosure.

Embodiments of the present disclosure will be described below with reference to the accompanying drawings.

First Embodiment (Structure of Stator)

A stator 10 according to a first embodiment will be described with reference to FIGS. 1 to 7. The stator 10 forms a part of a rotating electrical machine 100 including a rotor 20. For example, the rotating electrical machine 100 is configured as a motor or a generator. In this specification, the "axial direction" means the direction along the axis C of the stator 10 (the rotating electrical machine 100) (the direction shown by arrow Z). The "radial direction" means the radial direction of the stator 10 (the direction of the radius thereof: the direction shown by arrow R). The "inner side in the radial direction" refers to the inner side in the radial direction of the stator 10, and the "outer side in the radial direction" refers to the outer side in the radial direction of the stator 10 (a stator core 11). The "circumferential direction" means the circumferential direction of the stator 10 (the stator core 11) (the direction shown by arrow A).

Figure 2:
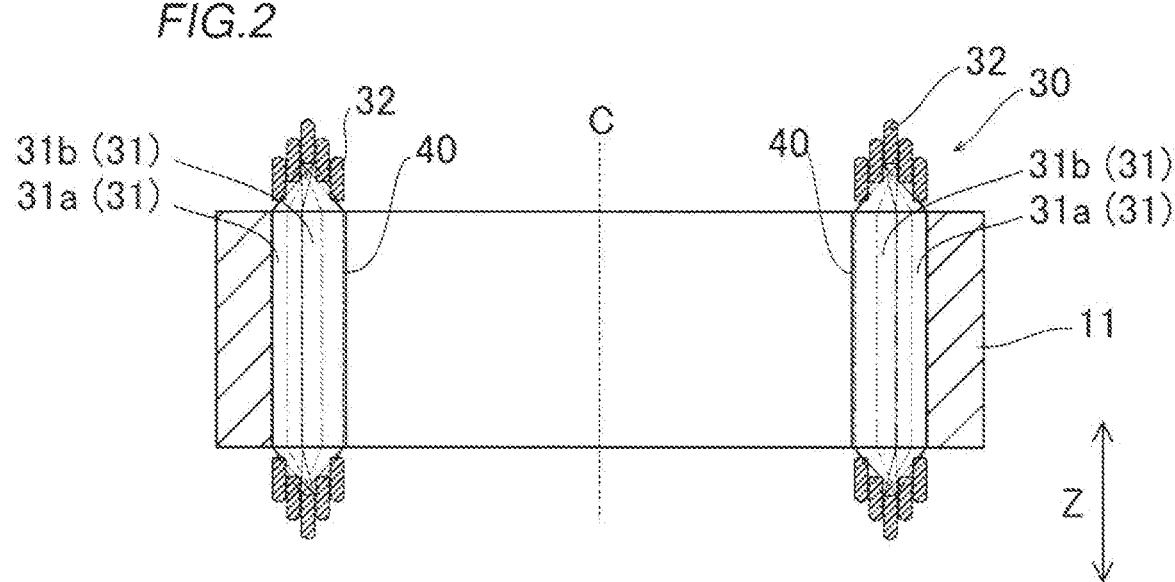
FIG. 2 is a sectional view of the stator according to the first embodiment of the present disclosure.

As shown in FIG. 1, the stator 10 (the stator core 11) is placed so as to face the outer peripheral surface of the rotor 20 in the radial direction. The stator core 11 has a plurality of slots 12. The stator core 11 also has a plurality of teeth 13 with each of the slots 12 interposed between the teeth 13. As shown in FIG. 2, the stator 10 includes coils 30 and wedges 40 which are placed in the slots 12.

Figure 3:
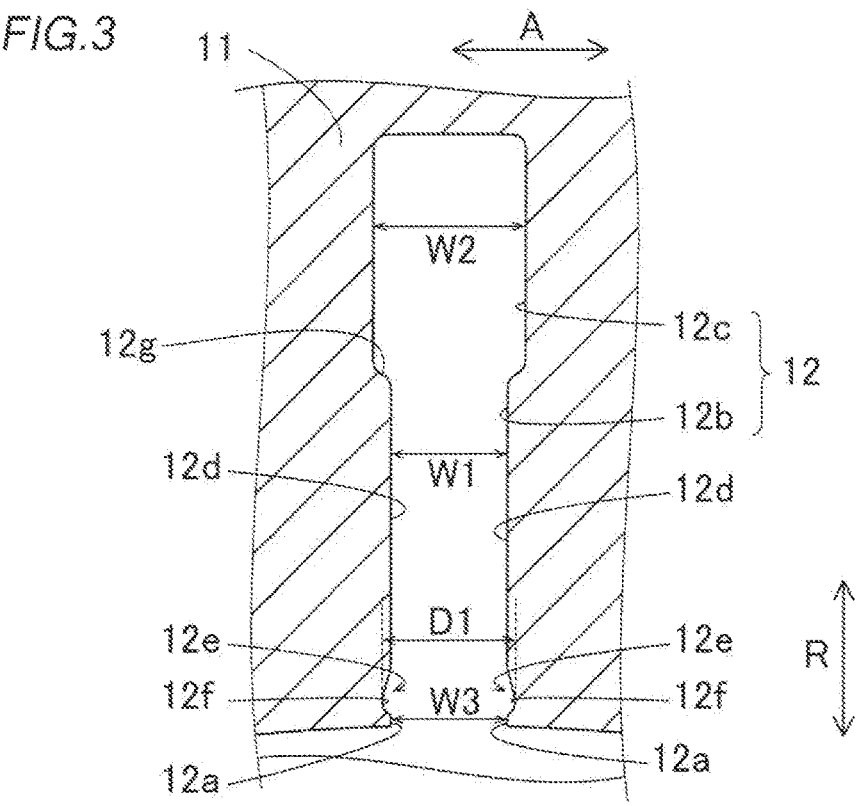
FIG. 3 is a plan view of a slot of a stator core according to the first embodiment of the present disclosure.

As shown in FIG. 3, each slot 12 has an opening 12a which opens radially inward and through which the coil 30 is passed when inserted into the slot 12 from the inner side in the radial direction. The opening 12a is an example of the "coil insertion opening."

Each slot 12 has a radially inner portion 12b of the slot 12 and a radially outer portion 12c of the slot 12. The stator core 11 includes a pair of wedge insertion grooves 12e formed in both circumferential side walls 12d of the tooth 13 at positions radially inside the portion 12b and extending in the axial direction of the stator core 11. In the circumferential direction, the width W2 of the portion 12c is greater than the width W1 of the portion 12b. The distance D1 between bottoms 12f of the pair of wedge insertion grooves 12e is greater than the width W1 of the portion 12b and is greater than the width W3 of the opening 12a. The width W1 is approximately equal to the width W3. The wedge insertion groove 12e is an example of the "recess." Both circumferential side walls 12d of each tooth 13 are an example of the "circumferential side wall."

Specifically, each wedge insertion groove 12e has an arc shape as viewed from one side in the axial direction. Engaging portions 41 of the wedge 40 described below are fitted in the wedge insertion grooves 12e, whereby the wedge insertion grooves 12e are engaged with the engaging portions 41. Each wedge insertion groove 12e and the opening 12a form a step where the circumferential width changes from D1 to W3 toward the inner side in the radial direction. This prevents the wedge 40 from coming off through the opening 12a toward the inner side in the radial direction.

Figure 4:
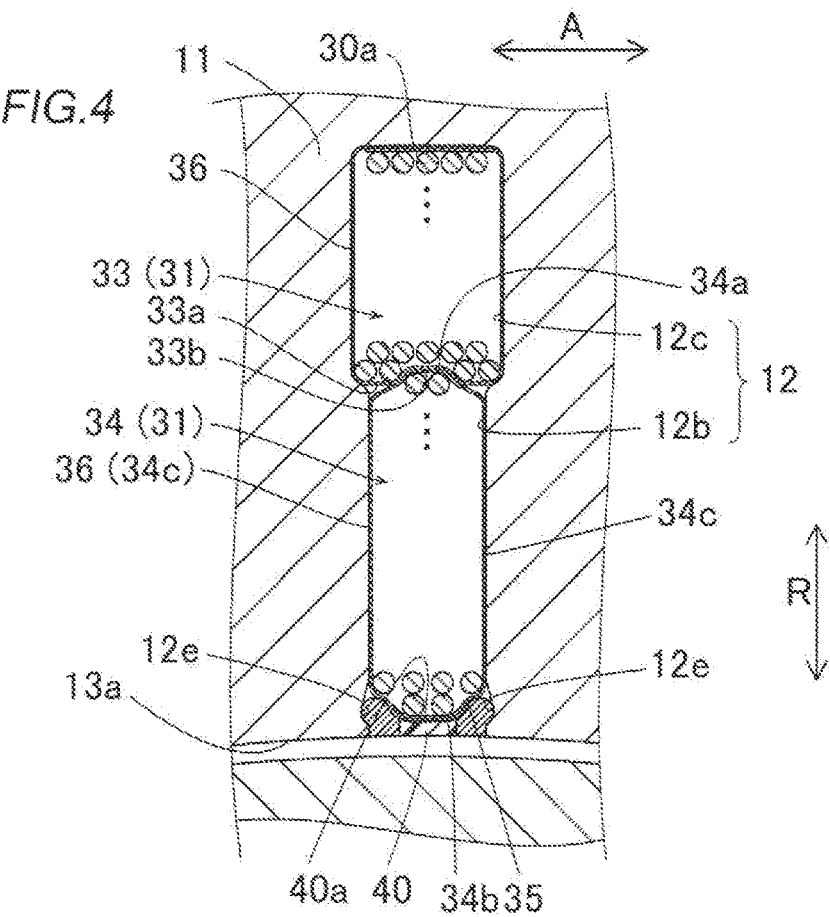
FIG. 4 is a plan view of coils and a wedge according to the first embodiment of the present disclosure.

Each slot 12 has, at the boundary between the radially outer portion 12c and the radially inner portion 12b, a stepped portion 12g that restricts a first accommodated portion 33 of a pair of slot accommodated portions 31 of the coil 30 described below from moving radially inward in the step of inserting a second accommodated portion 34 into the slot 12. As shown in FIG. 4, a first accommodated portion 33 of a pair of slot accommodated portions 31 is placed in the radially outer portion 12c of the slot 12. A second accommodated portion 34 of a pair of slot accommodated portions 31 of a different coil 30 from the coil 30 placed in the radially outer portion 12c is placed in the radially inner portion 12b of the slot 12.

Figure 5:
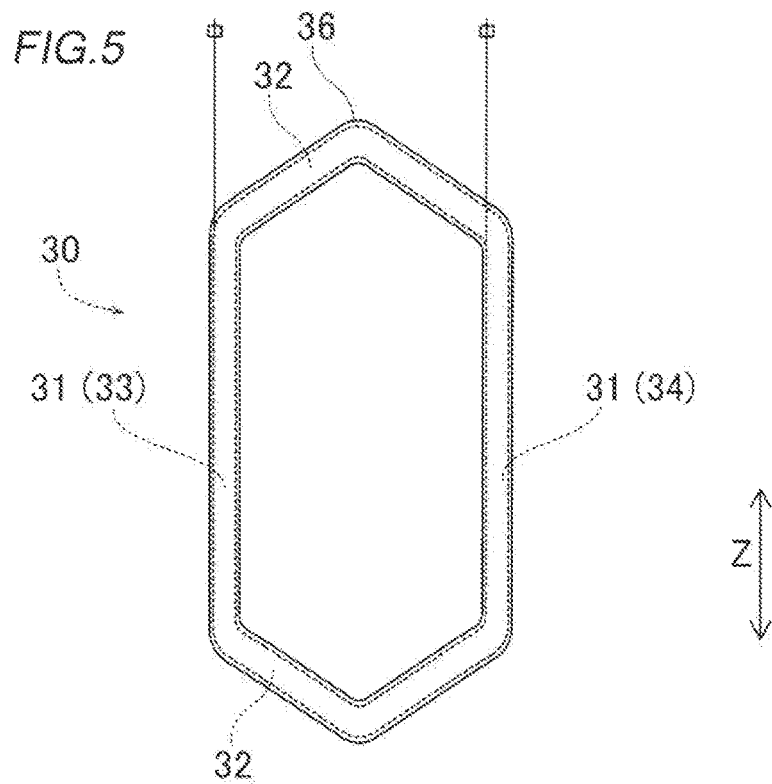
FIG. 5 is a front view of a coil according to the first embodiment of the present disclosure.

As shown in FIG. 4, each coil 30 is wound with a plurality of turns of a round wire 30a. As shown in FIG. 5, each coil 30 includes a pair of slot accommodated portions 31 that are accommodated in the slots 12 of the stator core 11 and a pair of coil end portions 32 connecting the pair of slot accommodated portions 31. As shown in FIG. 4, the first accommodated portion 33 of the pair of slot accommodated portions 31 is placed on the outer side in the radial direction in the slot 12 as viewed in the axial direction. The second accommodated portion 34 is placed in the slot 12 located a predetermined number of slots 12 away in the circumferential direction from the slot 12 where the first accommodated portion 33 is placed (see FIG. 12). That is, the coil 30 is formed as a double-layer lap winding coil.

The first accommodated portion 33 has a generally rectangular shape as viewed in the axial direction. The first accommodated portion 33 has in its radially inner surface 33a a coil recess 33b that is recessed radially outward. The second accommodated portion 34 has a coil protrusion 34a protruding radially outward and fitted in the coil recess 33b of the first accommodated portion 33. The second accommodated portion 34 also has a coil protrusion 34b protruding radially inward and fitted in a wedge recess 40a of the wedge 40 described below. Each circumferential surface 34c and the coil protrusion 34b of the second accommodated portion 34 are smoothly connected, and these connecting portions form guide portions 35 that guide the wedge 40 into the wedge insertion grooves 12e.

As shown in FIG. 5, the coil 30 has a sheet-like insulating member 36 attached thereto so as to cover the pair of slot accommodated portions 31 and the pair of coil end portions 32. For example, the insulating member 36 is formed by a core material made of a polyethylene naphthalate (PEN) film and a surface member made of aramid fibers placed so as to cover both surfaces of the core material.

Figure 6:
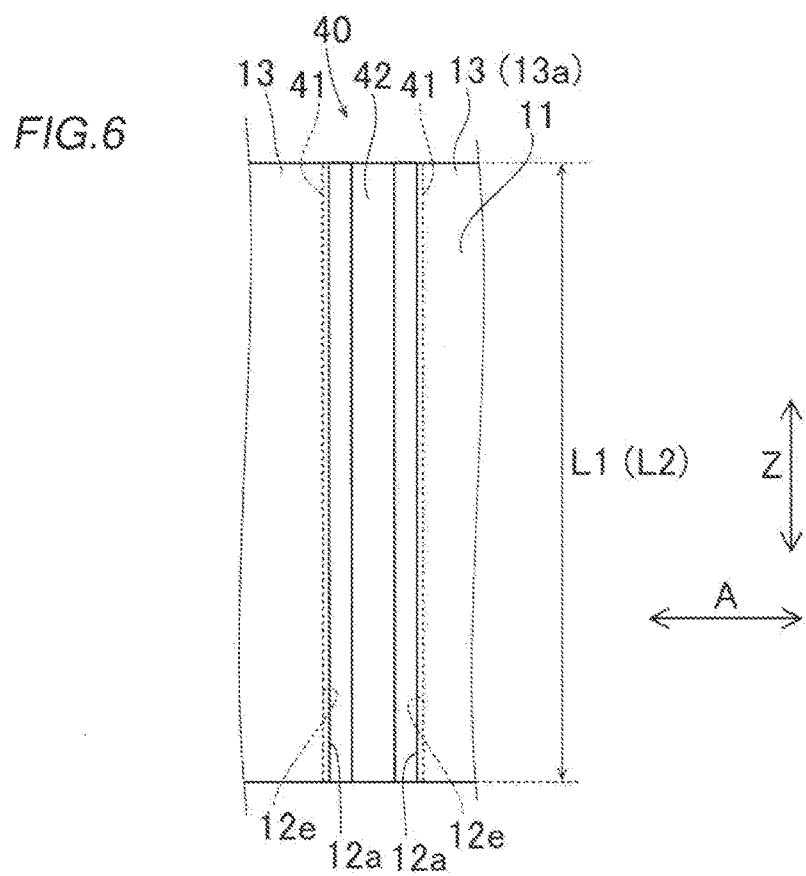
FIG. 6 is a view of a wedge placed so as to close an opening of the stator as viewed from the inner side in the radial direction according to the first embodiment of the present disclosure.

In the first embodiment, as shown in FIG. 6, the wedge 40 is placed in the wedge insertion grooves 12e so as to close the opening 12a as viewed from the inner side in the radial direction of the stator core 11, and contains a thermoplastic resin. The axial size L1 of the wedge 40 is approximately the same as the axial size L2 of the stator core 11.

Figure 7:
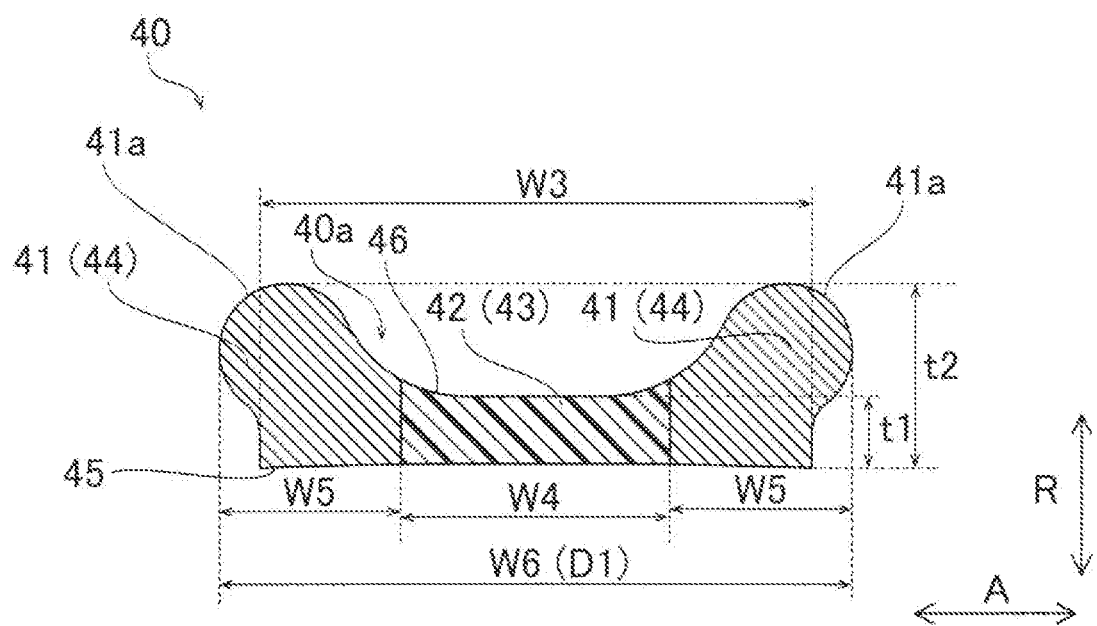
FIG. 7 is a sectional view of a wedge according to the first embodiment of the present disclosure.

Specifically, as shown in FIG. 7, the wedge 40 has a pair of engaging portions 41 that are formed near both ends of the wedge 40 in the circumferential direction and that engage with the wedge insertion grooves 12e, and a thermally deformable deformation portion 42 formed in the middle part of the wedge 40 in the circumferential direction.

Specifically, in the first embodiment, the wedge 40 is formed by two-color molding. The wedge 40 is formed by a first resin portion 43 forming the deformation portion 42 and second resin portions 44 formed on both sides of the first resin portion 43 in the circumferential direction and containing a soft magnetic material.

For example, the first resin portion 43 is made of a thermoplastic resin such as a polyphenylene sulfide resin (PPS). The first resin portion 43 can therefore be softened and deformed when heated (e.g., when heated to 280° C. or higher). That is, the first resin portion 43 contains a thermoplastic resin with a melting point of less than 280° C. The first resin portion 43 contains no soft magnetic material.

The second resin portions 44 is made of a thermosetting resin mixed with a soft magnetic material (e.g., iron powder). The second resin portions 44 can therefore be resin molded and can pass magnetic flux therethrough. The second resin portion 44 located on one side in the circumferential direction and the second resin portion 44 located on the other side in the circumferential direction are separated from each other with the first resin portion 43 therebetween. The first resin portion 43 therefore serves as a magnetic gap, preventing the magnetic flux from passing across the inner side in the radial direction in the coil 30 in the circumferential direction.

The circumferential width W4 of the first resin portion 43 is greater than the width W5 of the second resin portion 44 located on the one side in the circumferential direction and the width W5 of the second resin portion 44 located on the other side in the circumferential direction. For example, the width W4 is about half the width W3 of the wedge 40.

In the first embodiment, the radial thickness t1 of the first resin portion 43 is smaller than the radial thickness t2 of the second resin portion 44. That is, the thickness t1 of the deformation portion 42 is smaller than the thickness t2 of the engaging portion 41. Namely, the wedge 40 is relatively thin in the middle portion in the circumferential direction and is relatively thick in the portions at both ends in the circumferential direction. The thickness t1 means the thickness of the thinnest part of the first resin portion 43, and the thickness t2 means the thickness of the thickest part of the second resin portion 44.

W3 represents the circumferential width of a radially inner portion of the wedge 40 which closes the opening 12a of the slot 12. The width W6 of the wedge 40, which is the distance between both ends of the engaging portions 41 of the wedge 40 in the circumferential direction, is greater than the width W3. In the first embodiment, each of outer peripheral surfaces 41a of the pair of engaging portions 41 of the wedge 40 has an arc shape (e.g., a circular arc shape) as viewed from the one side in the axial direction. That is, each engaging portion 41 has a shape corresponding to the wedge insertion groove 12e and the guide portion 35 (see FIG. 13) of the coil 30. The width W6 is an example of the "second circumferential width." The "width W6" and the "width W7" described below mean the distance between the endmost portions.

A radially inner surface 45 of the wedge 40 is located at approximately the same radial position as (flush with) a radially inner surface 13a (see FIG. 4) of the stator core 11 (the teeth 13). A radially outer surface 46 of the wedge 40 forms the wedge recess 40a recessed radially inward and fitted on the coil protrusion 34b.

(Manufacturing Method of Stator)

Next, a method for manufacturing the stator 10 will be described with reference to FIGS. 5, 6, and 8 to 16.

<Step of Forming Wedges>

Figure 8:
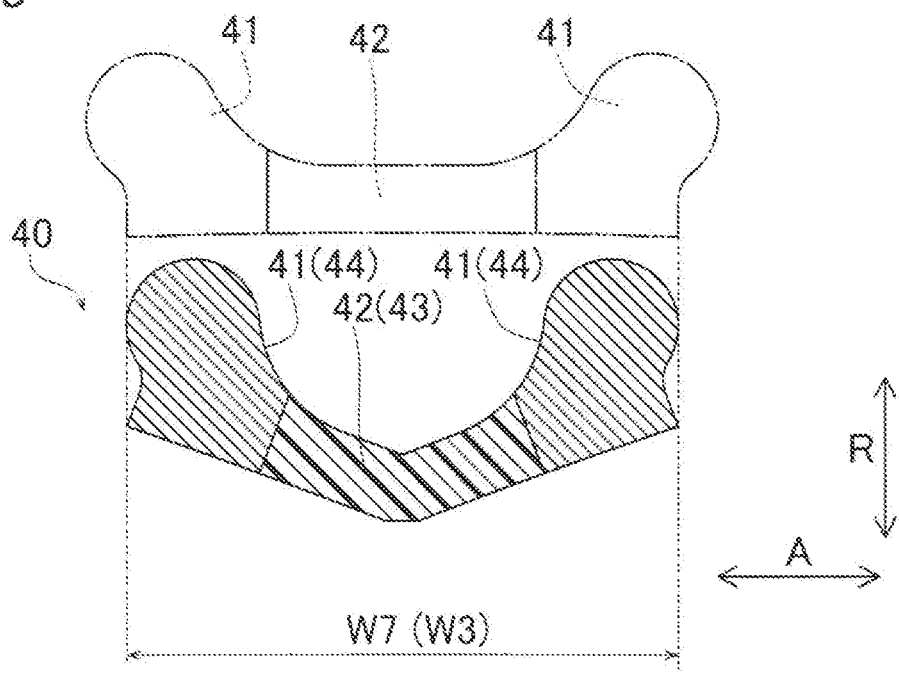
FIG. 8 is a sectional view of a wedge having a bent shape according to the first embodiment of the present disclosure.

The step of forming the wedges 40 is performed in the method for manufacturing the stator 10 according to the first embodiment. The step of forming the wedges 40 is performed prior to the step of placing the wedges 40 in the wedge insertion grooves 12e which will be described later. Specifically, as shown in FIG. 8, the wedges 40 with the width W7 equal to or smaller than the width W3 of the opening 12a of the slot 12 are formed in the step of forming the wedges 40. Although the width W7 is shown equal to the width W3 in FIG. 8, the width W7 can be equal to or smaller than the width W3. The width W7 is an example of the "first circumferential width."

Specifically, in the first embodiment, the wedges 40, each of which includes a pair of engaging portions 41 to be engaged with the wedge insertion grooves 12e and a thermally deformable deformation portion 42 formed between the pair of engaging portions 41 and in which the pair of engaging portions 41 and the deformation portion 42 form a bent shape, are formed in the step of forming the wedges 40. In other words, the wedges 40 with a bent shape are formed such that the deformation portion 42 formed in the middle portion in the circumferential direction protrudes radially inward and the pair of engaging portions 41 formed in both ends in the circumferential direction protrude radially outward.

Specifically, the wedges 40 are formed by two-color molding. First, a resin material containing a thermoplastic resin such as PPS (a material of the first resin portion 43) is prepared. A resin material (a material of the second resin portions 44), which is a thermosetting resin mixed with a magnetic material (e.g., iron powder), is also prepared. After the first resin portion 43 that forms the deformation portion 42 is molded, the second resin portions 44 that form the pair of engaging portions 41 are formed on both sides of the first resin portion 43. It is preferable that the first resin portion 43 contain no magnetic material.

<Step of Forming Coils>

As shown in FIG. 5, each coil 30 is formed by winding a round wire 30*a*. Specifically, the round wire 30*a* is wound a plurality of turns around a bobbin, not shown. The insulating member 36 is then attached to the coil 30 so as to cover at least a pair of slot accommodated portions 31 of the coil 30. Specifically, the insulating member 36 is attached to the coil 30 so as to cover the pair of slot accommodated portions 31 and coil end portions 32. The insulating member 36 covering the coil 30 has an annular shape (hexagonal shape).

<Step of Inserting Coils into Slots>

Figure 9:
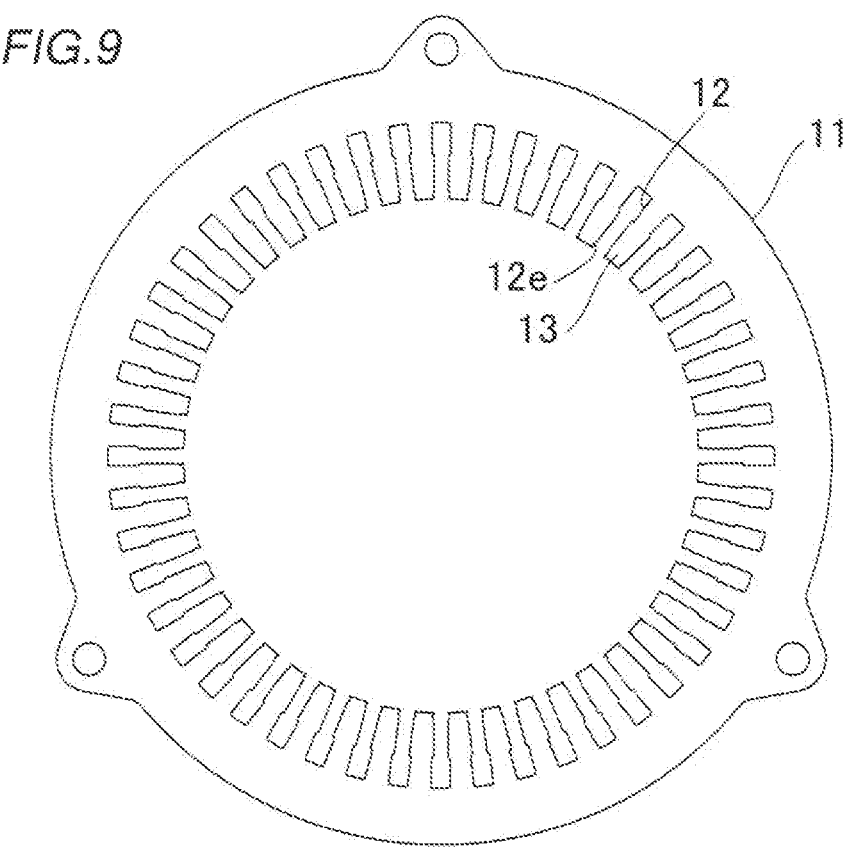
FIG. 9 is a plan view of the stator core according to the first embodiment of the present disclosure.
Figure 10:
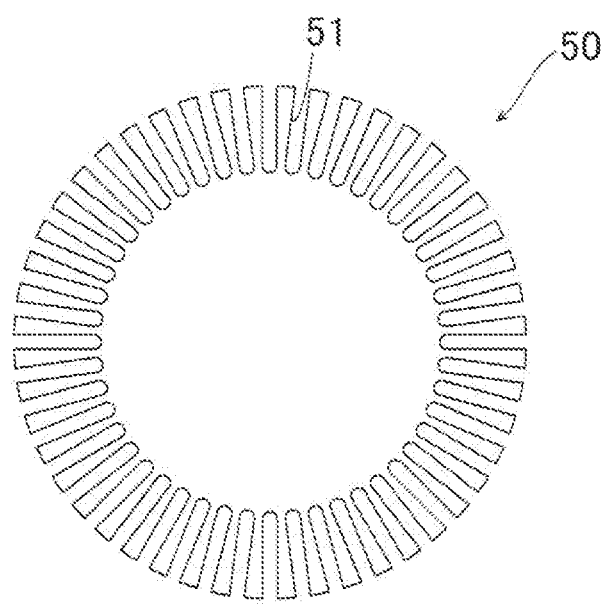
FIG. 10 is a view of a coil insertion jig that inserts coils into slots according to the first embodiment of the present disclosure.

Next, the step of inserting the coils 30 into the slots 12 is performed. As shown in FIG. 9, the stator core 11 is first formed by stacking electrical steel sheets in the axial direction. As shown in FIG. 10, a coil insertion jig 50 having grooves 51 formed so as to correspond to the slots 12 of the stator core 11 is prepared.

Figure 11:
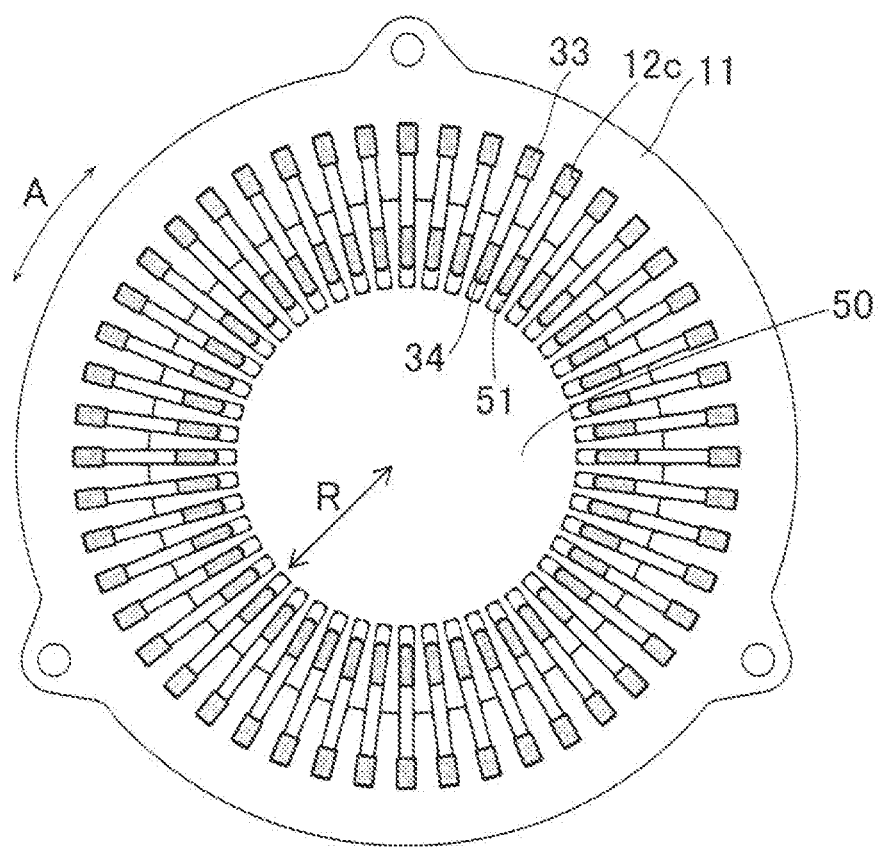
FIG. 11 is a view illustrating the step of inserting first accommodated portions of coils into the slots according to the first embodiment of the present disclosure.

As shown in FIG. 11, the coil insertion jig 50 is then placed radially inside the stator core 11 such that the grooves 51 of the coil insertion jig 50 face the slots 12. The first accommodated portion 33 of the pair of slot accommodated portions 31 is placed in the radially outer portion 12*c* of the slot 12 and the second accommodated portion 34 thereof is placed in the groove 51. The same number of coils 30 as that of slots 12 (grooves 51) is placed in the slots 12 and the grooves 51.

Figure 12:
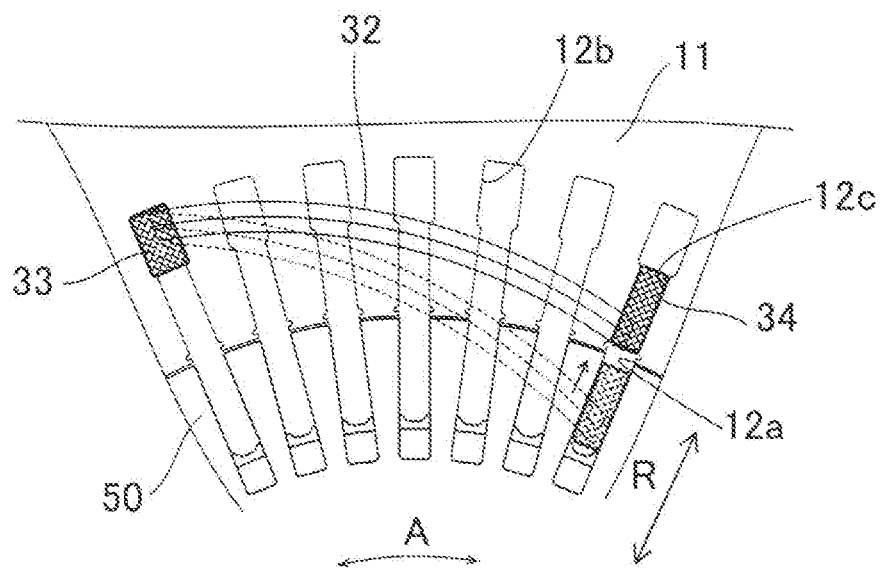
FIG. 12 is a view illustrating the step of inserting second accommodated portions of the coils into the slots according to the first embodiment of the present disclosure.

As shown in FIG. 12, the coil insertion jig 50 and the stator core 11 are then moved (rotated) relative to each other in the circumferential direction, whereby the coils 30 are deformed. The second accommodated portions 34 placed so as to face the first accommodated portions 33 in the radial direction before the coil insertion jig 50 is moved (rotated) as shown in FIG. 11 are thus moved in the circumferential direction by an amount corresponding to a predetermined number of slots 12. The coil recesses 33*b* and the coil protrusions 34*a*, 34*b* are not shown in FIGS. 11 and 12.

The second accommodated portion 34 of each coil 30 is then inserted into the slot 12 located away in the circumferential direction from the slot 12 having the first accommodated portion 33 of that coil 30 placed therein. Specifically, each second accommodated portion 34 is gradually moved radially outward. Each second accommodated portion 34 is thus inserted from the inner side in the radial direction from the groove 51 through the opening 12*a* into the radially inner portion 12*b* of the slot 12.

<Step of Placing Wedges in Wedge Insertion Grooves>

Next, the step of placing the wedges 40 in the wedge insertion grooves 12*e* is performed in the method for manufacturing the stator 10 according to the first embodiment. In the step of placing the wedges 40 in the wedge insertion grooves 12*e*, each wedge 40 containing a thermoplastic resin is moved radially outward from the inner side in the radial direction of the stator core 11 through the opening 12*a* while being thermally deformed. The wedge 40 is thus placed in the wedge insertion grooves 12*e* so as to close the opening 12*a* as viewed from the inner side in the radial direction of the stator core 11.

Figure 13:
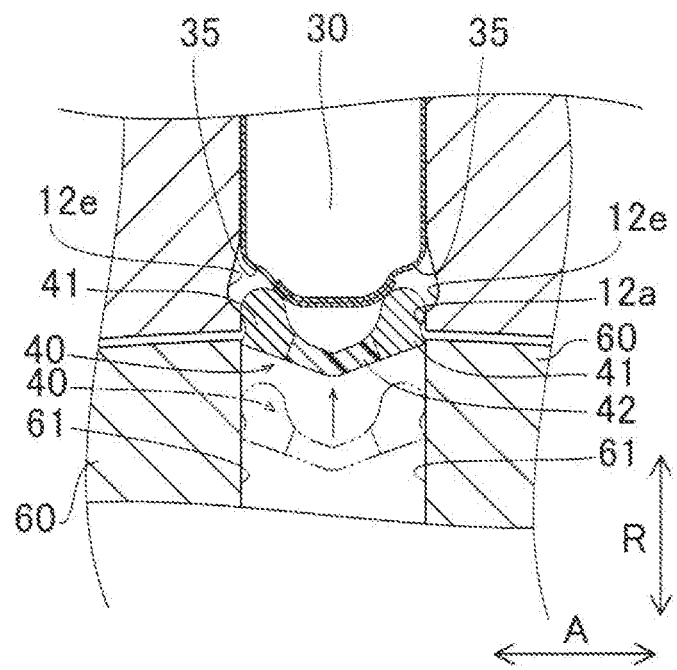
FIG. 13 is a view (initial stage) illustrating the step of placing a wedge in wedge insertion grooves according to the first embodiment of the present disclosure.

Specifically, as shown in FIG. 13, in the first embodiment, the wedge 40 is placed in the opening 12*a* of each slot 12 so as to have a bent shape as viewed from the one side in the axial direction. In other words, the wedge 40 is placed in the opening 12*a* of each slot 12 so that the lateral direction of the wedge 40 extends in the circumferential direction of the stator core 11. For example, the wedges 40 are placed in the openings 12*a* by a wedge placement jig 60. The wedge placement jig 60 has grooves 61 extending in the radial direction, and the wedges 40 are placed in the openings 12*a* via the grooves 61.

Figure 14:
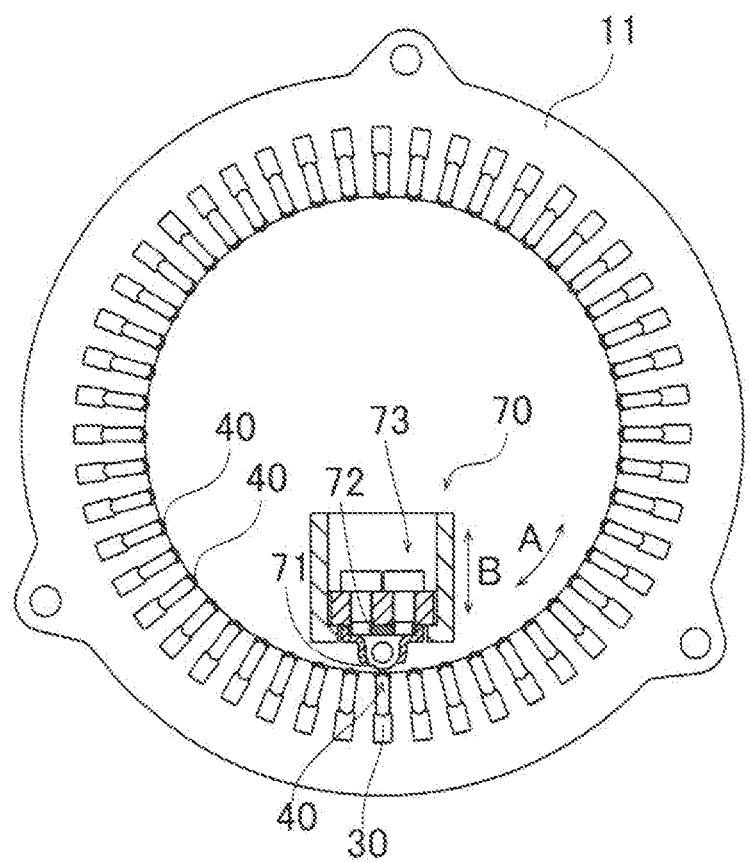
FIG. 14 is a plan view of a heating and pressing device that places a wedge in wedge insertion grooves according to the first embodiment of the present disclosure.
Figure 15:
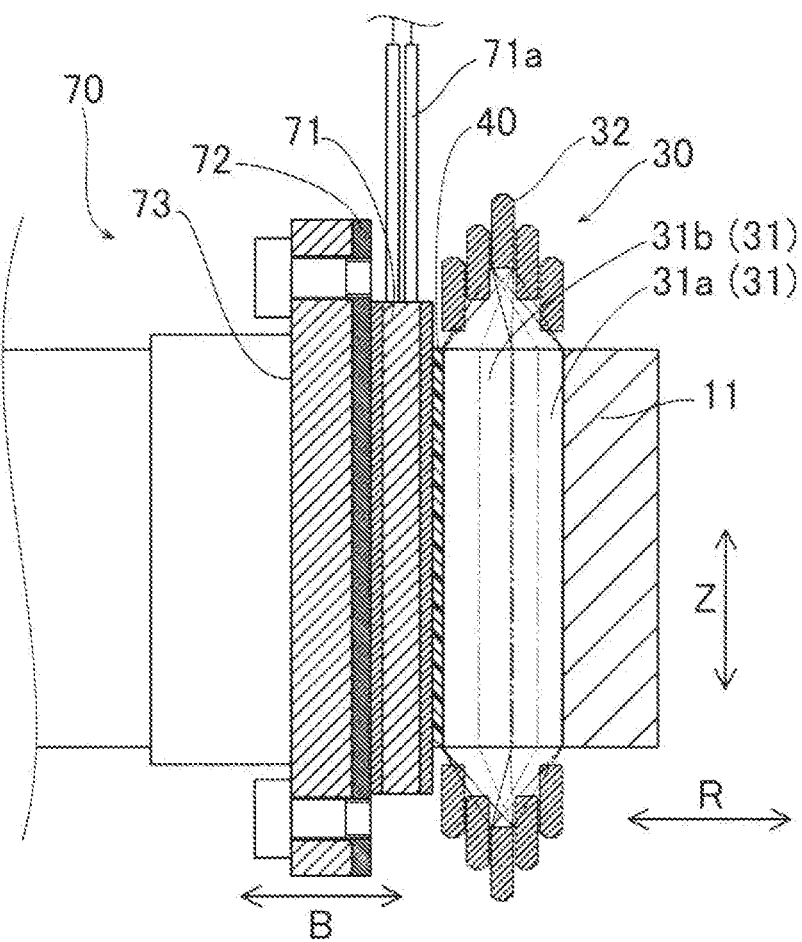
FIG. 15 is a sectional view of the heating and pressing device that places a wedge in wedge insertion grooves according to the first embodiment of the present disclosure.

As shown in FIG. 14, a heating and pressing device 70 including a cylindrical (rod-like) heater 71, a heat insulating unit 72, and a heater holding unit 73 is placed radially inside the stator core 11. For example, as shown in FIG. 15, the heater 71 is heated to about 280° C. with electric power supplied through a lead 71*a*. The insulating unit 72 restrains heat of the heater 71 from being transferred to the remaining part of the heating and pressing device 70. The heater holding unit 73 holding the heater 71 and the heat insulating unit 72 is movable relative to the stator core 11 in the radial direction (the direction shown by arrow B) and the circumferential direction (the direction shown by arrow A).

Figure 16:
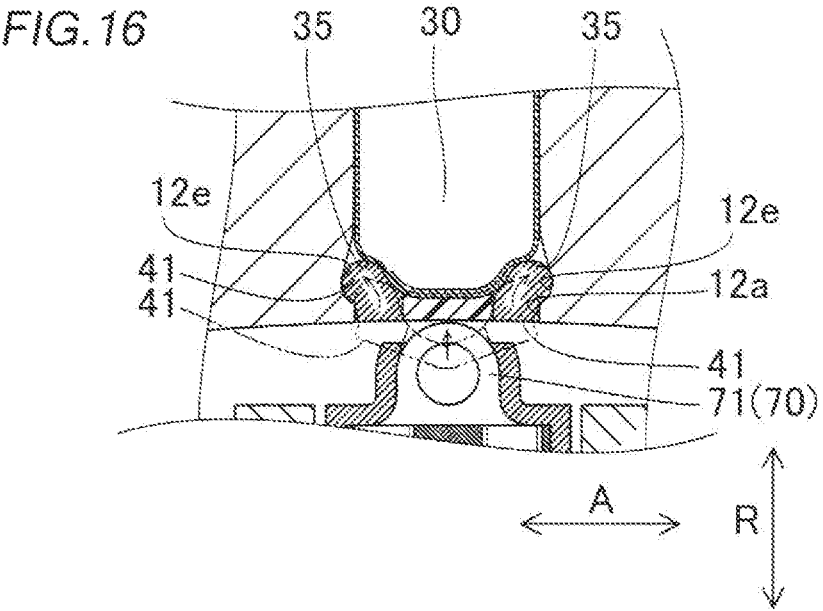
FIG. 16 is a view (final stage) illustrating the step of placing a wedge in wedge insertion grooves according to the first embodiment of the present disclosure.

As shown in FIG. 16, the wedge 40 is then heated and pressed from the inner side in the radial direction of the stator core 11 by the heating and pressing device 70. The wedge 40 is thus thermally deformed with only the deformation portion 42 of the first resin portion 43 of the wedge 40 being softened, and the pair of engaging portions 41 of the wedge 40 is moved by the guide portions 35 of the coil 30 toward the wedge insertion grooves 12*e* that are located circumferentially outside the coil 30. As the distance between the pair of engaging portions 41 increases in the circumferential direction, the wedge 40 with the bent shape is straightened in the circumferential direction and the width of the wedge 40 becomes larger than the width W7 (W3). Since the pair of engaging portions 41 contains iron powder and contacts the coil 30 and the teeth 13, the temperature of the pair of engaging portions 41 is lower than that of the deformation portion 42.

The pair of engaging portions 41 of the wedge 40 is thus fitted into and engaged with the wedge insertion grooves 12*e*. When the pair of engaging portions 41 is engaged with the wedge insertion grooves 12*e*, the width of the wedge 40 changes to the width W6 that is greater than the width W3 of the opening 12*a* and approximately equal to the distance D1 between the wedge insertion grooves 12*e*.

Subsequently, the heating and pressing device 70 and the stator core 11 are moved relative to each other in the circumferential direction by an amount corresponding to a single slot 12. Another wedge 40 is then inserted and placed in the wedge insertion grooves 12*e* through the opening 12*a* from the inner side in the radial direction in a manner described above by the heating and pressing device 70. This operation is repeated until all the wedges 40 placed in the openings 12*a* of each slot 12 are placed in the wedge insertion grooves 12*e* so as to close the openings 12*a* as viewed from the inner side in the radial direction as shown in FIG. 1.

<Step of Fixing Wedges>

After the step of placing the wedges 40 in the wedge insertion grooves 12*e*, the step of fixing the shape of the wedges 40 with the pair of engaging portions 41 engaged with the wedge insertion grooves 12e is performed by completing (stopping) the heating of the wedges 40. That is, each wedge 40 is cured since the temperature of the thermoplastic resin contained in the softened deformation portion 42 of the wedge 40 falls. In other words, each wedge 40 straightened from the bent shape, having the width W6, and having the pair of engaging portions 41 engaged with the wedge insertion grooves 12e is cured, so that the shape of the wedge 40 is fixed. The wedges 40 are thus prevented from coming off through the openings 12a toward the inner side in the radial direction and prevent the coils 30 from coming off through the openings 12a toward the inner side in the radial direction.

Second Embodiment

Figure 17:
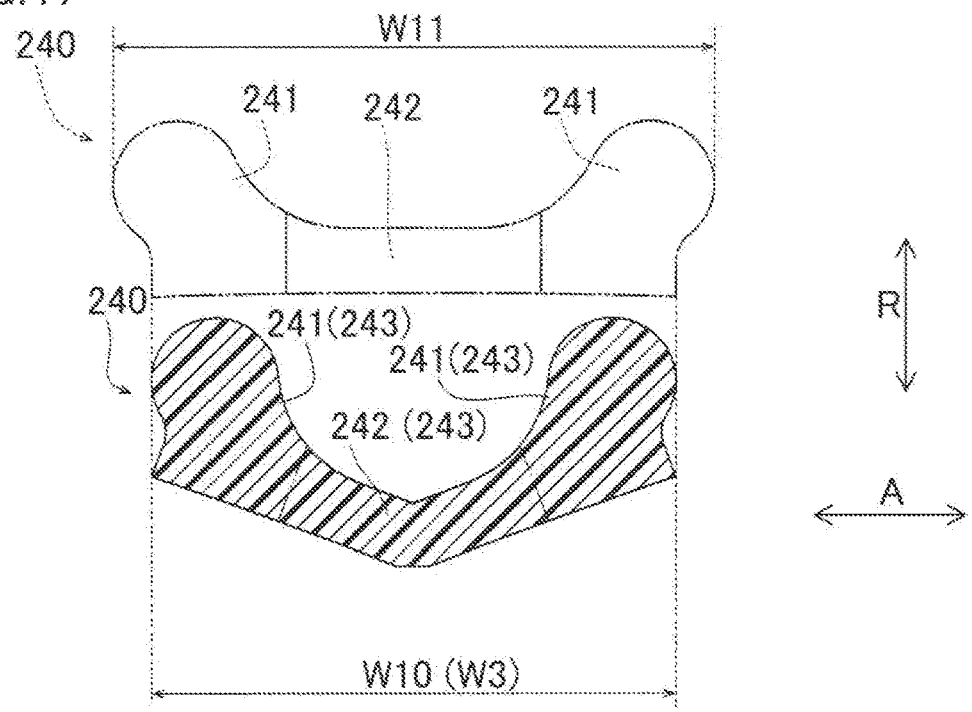
FIG. 17 is a sectional view showing the configuration of a wedge of a stator according to a second embodiment of the present disclosure.

A stator 210 according to a second embodiment will be described with reference to FIGS. 1 and 17. The stator 210 according to the second embodiment includes wedges 240 made of a first resin 243 rather than the wedges 40 of the first embodiment which are formed by the first resin portion 43 and the second resin portions 44 by two-color molding. The same configurations as the first embodiment are denoted with the same reference characters in the figures and description thereof will be omitted.

In the second embodiment, as shown in FIG. 1, the stator 210 includes the wedges 240. As shown in FIG. 17, each wedge 240 is made of the first resin 243 containing a thermoplastic resin. That is, the first resin 243 of the wedge 240 includes both a deformation portion 242 formed in the middle portion in the circumferential direction and a pair of engaging portions 241 formed near both ends in the circumferential direction. The wedges 240 can therefore be more easily formed as compared to the case where the wedges 240 are formed by two-color molding. Like the wedges 40 of the first embodiment, the wedges 240 are formed so as to have a width W10 in the circumferential direction and to have a bent shape. When the wedge 240 with the bent shape is placed in the wedge insertion grooves 12e, the deformation portion 242 is thermally deformed, so that the wedge 240 is deformed to have a width W11 (approximately equal to the distance D1). The configuration of the stator 210 and the manufacturing method thereof are otherwise similar to those of the stator 10 of the first embodiment. The width W10 is an example of the "first circumferential width." The width W11 is an example of the "second circumferential width."

Third Embodiment

A stator 310 according to a third embodiment will be described with reference to FIGS. 18 to 20. The stator 310 according to the third embodiment includes a connecting portion 350 connecting wedges 340 to each other in the circumferential direction of the stator core 11. The same configurations as those of the first or second embodiment are denoted with the same reference characters in the figures and description thereof will be omitted.

Figure 18:
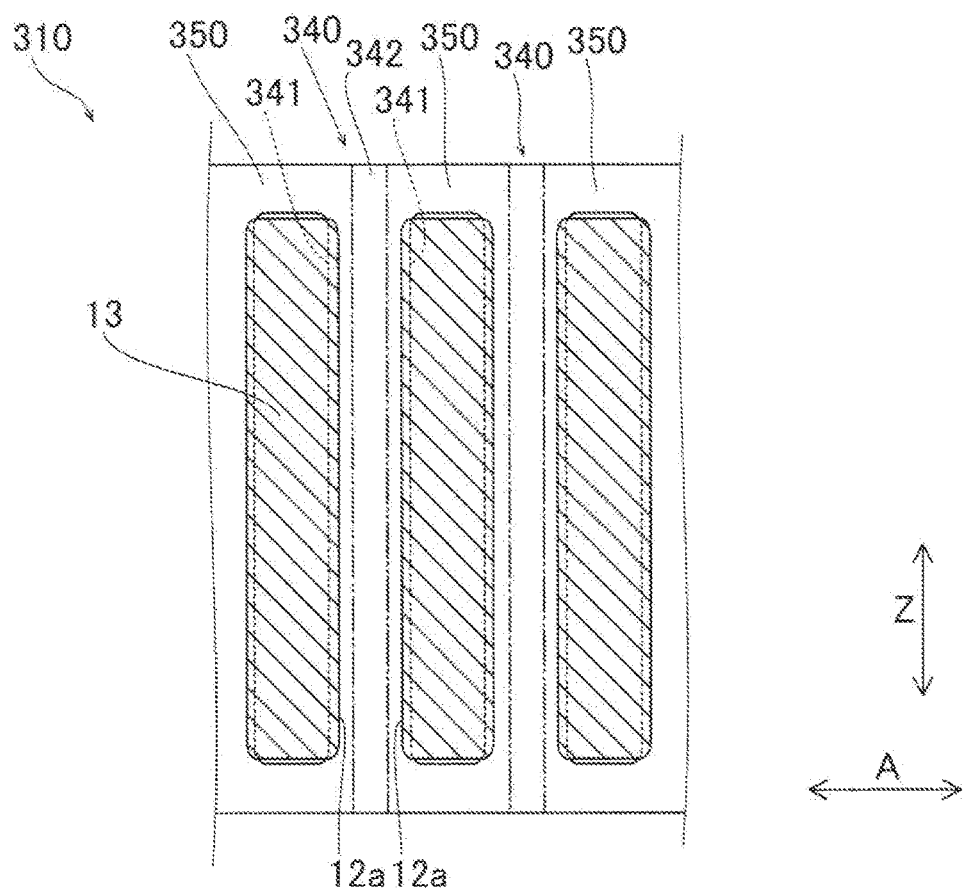
FIG. 18 is a view of wedges and a connecting portion of a stator as viewed from the inner side in the radial direction according to a third embodiment of the present disclosure.
Figure 19:
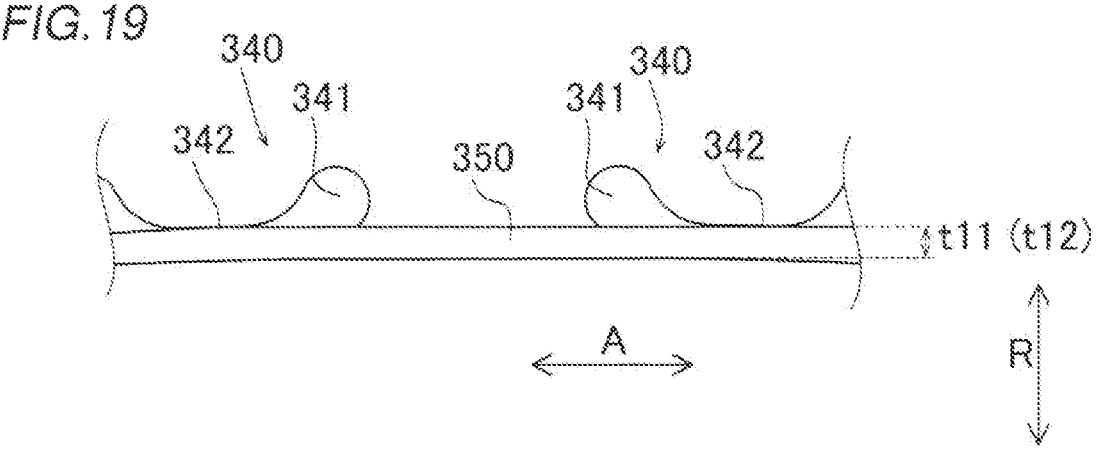
FIG. 19 is a view of wedges and the connecting portion of the stator as viewed from one side in the axial direction according to the third embodiment of the present disclosure.

In the third embodiment, as shown in FIG. 18, the stator 310 includes the connecting portion 350 placed on both sides in the axial direction of the stator core 11 and connecting the plurality of wedges 340 to each other in the circumferential direction of the stator core 11. Specifically, the connecting portion 350 is formed integrally with the plurality of wedges 340 and has an annular shape (see FIG. 20) as viewed from the one side in the axial direction. The wedges 340 are configured similarly to the wedges 40 of the first embodiment and the wedges 240 of the second embodiment. The connecting portion 350 may be made of a thermoplastic resin or may be made of a thermosetting resin. For example, the radial thickness t11 of the connecting portion 350 is approximately equal to the thickness t12 of a deformation portion 342 of the wedge 340. The configuration of the stator 310 is otherwise similar to that of the stator 10 of the first embodiment.

(Manufacturing Method of Stator of Third Embodiment)

Figure 20:
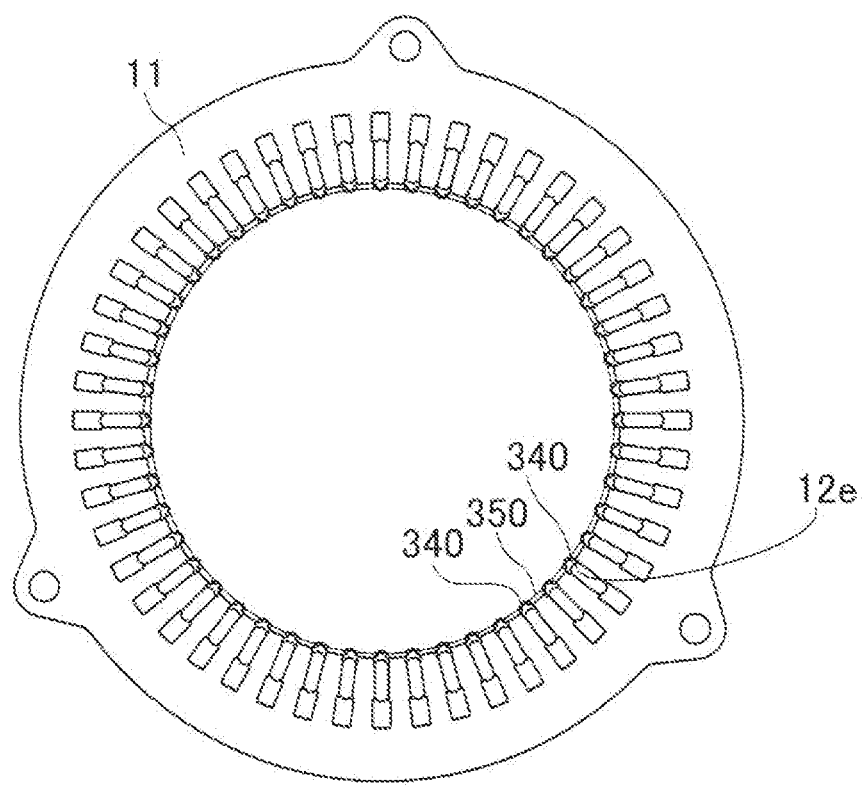
FIG. 20 is a plan view illustrating the step of inserting wedges and the connecting portion into wedge insertion grooves of the stator according to the third embodiment of the present disclosure.

In the third embodiment, as shown in FIG. 20, the plurality of wedges 340 with a bent shape are formed integrally with the connecting portion 350. After the plurality of wedges 340 connected together by the connecting portion 350 are placed radially inside the stator core 11, each wedge 340 is inserted into the wedge insertion grooves 12e by the heating and pressing device 70 (see FIGS. 14 and 15) in a manner similar to that in the method for manufacturing the stator 10 according to the first embodiment. The method for manufacturing the stator 310 is otherwise similar to the method for manufacturing the stator 10 according to the first embodiment.

Effects of Structures of First to Third Embodiments

In the first to third embodiments, a wedge (40, 240, 340) contains a thermoplastic resin. A circumferential width of the wedge (40, 240, 340) can thus be changed by heating the wedge (40, 240, 340). Accordingly, by forming the wedge (40, 240, 340) with a width smaller than a circumferential width of a coil insertion opening (12a), the wedge (40, 240, 340) can be inserted in a radial direction into a slot (12) through the coil insertion opening (12a). Moreover, during or after the insertion, the wedge (40, 240, 340) is thermally deformed so that the circumferential width of the wedge (40, 240, 340) becomes larger than that of the coil insertion opening (12), whereby the wedge (40, 240, 340) can be engaged with recesses (12e). Unlike the case where a wedge (40, 240, 340) is engaged with recesses (12e) by moving the wedge (40, 240, 340) in an axial direction without thermally deforming the wedge (40, 240, 340), axial friction between the wedge (40, 240, 340) and the coil (30) can therefore be prevented even in the case where occupancy of the coil (30) in the slot (12) is increased and a stator core (11) has a relatively large axial length. Accordingly, even in the case where occupancy of the coil (30) in the slot (12) is increased, the wedge (40, 240, 340) can be easily placed in the recesses (12e) of the slot (12) without applying load to the coil (30).

In the first to third embodiments, the wedge (40, 240, 340) includes a pair of engaging portions (41, 241, 341) formed near both ends of the wedge (40, 240, 340) in a circumferential direction of the stator core (11) and engaged with the recesses (12e), and a thermally deformable deformation portion (42, 242, 342) formed in a middle portion of the wedge (40, 240, 340) in the circumferential direction of the stator core (11). With this configuration, after the pair of engaging portions (41, 241, 341) of the wedge (40, 240, 340) is passed through the coil insertion opening (12a), the middle portion of the wedge (40, 240, 340) is thermally deformed, whereby the pair of engaging portions (41, 241, 341) can be moved and easily engaged with the recesses (wedge insertion grooves) (12e).

In the first to third embodiments, in the radial direction of the stator core (11), a radial thickness (t1, t12) of the deformation portion (42, 242, 342) is smaller than that (t2) of the pair of engaging portions (41, 241, 341). With this configuration, since the radial thickness (t1, t2) of the deformation portion (42, 242, 342) is smaller, the deformation portion (42, 242, 342) can be easily thermally deformed.

Moreover, since the radial thickness (t2) of the pair of engaging portions (41, 241, 341) is relatively large, the contact area of the pair of engaging portions (41, 241, 341) with the recesses (12c) can be increased. Engagement strength can therefore be increased. Since the pair of engaging portions (41, 241, 341) has a large radial thickness, mechanical strength of the pair of engaging portions (41, 241, 341) can be increased.

In the first to third embodiments, the wedge (40, 240, 340) is formed so that outer peripheral surfaces (41a) of the pair of engaging portions (41, 241, 341) have an arc shape as viewed from one side in the axial direction of the stator core (11). With this configuration, the wedge (40, 240, 340) can be easily formed by resin molding, and the outer peripheral surfaces (41a) of the pair of engaging portions (41, 241, 341) which have an arc shape can be prevented from being caught by the coil (30) and side walls (12d) of the slot (12) other than the recesses (12e) when the deformation portion (42, 242, 342) is thermally deformed. The wedge (40, 240, 340) can thus be easily placed with the recesses (12e) of the slot (12).

In the first or third embodiment, the wedge (40, 340) is formed integrally by a first resin (43, 243) forming the deformation portion (42, 342) and a second resin (44) forming the pair of engaging portions (41, 341) and containing a magnetic material. With this configuration, magnetic flux can be passed through the portions where the pair of engaging portions (41, 341) is placed, whereby magnetic characteristics of the stator (10, 310) can be improved.

In the third embodiment, the stator further includes: a connecting portion (341) that is placed on the one side in the axial direction of the stator core (11) and connects a plurality of the wedges (340) to each other in the circumferential direction of the stator core (11). With this configuration, the plurality of wedges (340) can be formed integrally, whereby the number of steps required to form the wedges (340) can be reduced.

Effects of Manufacturing Methods of First to Third Embodiments

In the first to third embodiments, a wedge (40, 240, 340) containing a thermoplastic resin is moved from one side in a radial direction of a stator core (11) toward the other side in the radial direction through a coil insertion opening (12a) while thermally deforming the wedge (40, 240, 340). Unlike the case where a wedge (40, 240, 340) is engaged with recesses (12e) by moving the wedge (40, 240, 340) in an axial direction without thermally deforming the wedge (40, 240, 340), axial friction between the wedge (40, 240, 340) and the coil (30) can therefore be prevented even in the case where occupancy of the coil (30) in the slot (12) is increased and the stator core (11) has a relatively large axial length. As a result, a method for manufacturing a stator (10, 210, 310) can be provided in which a wedge (40, 240, 340) can be easily placed in recesses (12e) of a slot (12) without applying load to a coil even in the case where occupancy of the coil (30) in the slot (12) is increased.

In the first to third embodiments, the method for manufacturing a stator further includes the step of: prior to the step of engaging the wedge (40, 240, 340) with the recesses (12e), forming the wedge (40, 240, 340) having a first circumferential width (W7, W10) smaller than a width of the coil insertion opening (12a) in a circumferential direction of the stator core (11). The step of engaging the wedge (40, 240, 340) with the recesses (12e) is the step of disposing the wedge (40, 240, 340) so that a lateral direction of the wedge (40, 240, 340) extends in the circumferential direction of the stator core (11), and engaging the wedge (40, 240, 340) with the recesses (12e) while thermally deforming the wedge (40, 240, 340) so that a width of the wedge (40, 240, 340) changes from the first circumferential width (W7, W10) to a second circumferential width (W6, W11) larger than the width (W3) of the coil insertion opening (12a). With this configuration, the wedge (40, 240, 340) formed can be passed through the coil insertion opening (12a) without performing deformation for reducing the width of the wedge (40, 240, 340). Since the deformation for reducing the width of the wedge (40, 240, 340) is not required, an increase in the number of steps in the assembly process of the stator (10, 210, 310) can be prevented.

In the first to third embodiments, the step of forming the wedge (40, 240, 340) is the step of forming the wedge (40, 240, 340) which includes a pair of engaging portions (41, 241, 341) to be engaged with the recesses (12e) and a thermally deformable deformation portion (42, 242, 342) formed between the pair of engaging portions (41, 241, 341) and in which the pair of engaging portions (41, 241, 341) and the deformation portion (42, 242, 342) form a bent shape, and the step of engaging the wedge (40, 240, 340) with the recesses (12e) is the step of engaging the wedge (40, 240, 340) with the recesses (12e) by moving the wedge (40, 240, 340) toward the other side in the radial direction while thermally deforming the wedge (40, 240, 340) so that the pair of engaging portions (41, 241, 341) of the wedge (40, 240, 340) disposed on the one side in the radial direction of the stator core (11) so as to have the bent shape as viewed from one side in the axial direction of the stator core (11) moves outward in the circumferential direction of the stator core (11). With this configuration, since the wedge (40, 240, 340) with the bent shape is straightened in the circumferential direction of the stator core (11), the width of the wedge (40, 240, 340) can be easily changed from the first circumferential width (W7, W10) to the second circumferential width (W6, W11). Moreover, the pair of engaging portions (41, 241, 341) can be easily engaged with the recesses (12e), so that the wedge (40, 240, 340) can be engaged with the recesses (12e) (the slot: 12).

In the first to third embodiments, the step of engaging the wedge (40, 240, 340) with the recesses (12e) is the step of heating and pressing the wedge (40, 240, 340) from the one side in the radial direction of the stator core (11) so that the pair of engaging portions (41, 241, 341) is guided into the recesses (12e) by the coil (30), thereby engaging the wedge (40, 240, 340) with the recesses (12e) so that the pair of engaging portions (41, 241, 341) is engaged with the recesses (12e). With this configuration, since the pair of engaging portions (41, 241, 341) is guided into the recesses (12e) by the coil (30), the pair of engaging portions (41, 241, 341) can be engaged with the recesses (12e) without mounting a special jig for engaging the pair of engaging portions (41, 241, 341) with the recesses (12e). This can prevent the configuration of an apparatus for manufacturing the stator (10, 210, 310) from becoming complicated.

In the first to third embodiments, the step of engaging the wedge (40, 240, 340) with the recesses (12e) is the step of heating and pressing from the one side in the radial direction of the stator core (11) the deformation portion (42, 242, 342) of the wedge (40, 240, 340) having the bent shape and disposed so that the deformation portion (42, 242, 342) protrudes toward the one side in the radial direction of the stator core (11), thereby engaging the wedge (40, 240, 340) with the recesses (12e) while thermally deforming the deformation portion (42, 242, 342) so that the pair of engaging portions (41, 241, 341) of the wedge (40, 240, 340) moves outward in the circumferential direction of the stator core (11). With this configuration, since the deformation portion (42, 242, 342) is thermally deformed, the pair of engaging portions (41, 241, 341) can be moved without being thermally deformed. Accordingly, the pair of engaging portions (41, 241, 341) can be engaged with the recesses (12e) while the pair of engaging portions (41, 241, 341) is prevented from losing its shape (being deformed).

In the first to third embodiments, the method for manufacturing a stator further includes the step of: after the step of engaging the wedge (40, 240, 340) with the recesses (12e), completing the heating of the wedge (40, 240, 340), thereby fixing a shape of the wedge (40, 240, 340) having the pair of engaging portions (41, 241, 341) engaged with the recesses (12e). With this configuration, since the shape of the wedge (40, 240, 340) is fixed, the wedge (40, 240, 340) can be prevented from being deformed and coming off from the recesses (12e).

Modifications

The embodiments disclosed herein are merely by way of example in all respects and should not be construed as restrictive.

For example, the first to third embodiments are described with respect to an example in which the wedges contain PPS as a thermoplastic resin. However, the present disclosure is not limited to this. The wedges may contain a thermoplastic resin other than PPS.

The first to third embodiments are described with respect to an example in which the engaging portions of the wedges contain iron powder as a magnetic material. However, the present disclosure is not limited to this. The engaging portions of the wedges may contain a magnetic material other than iron powder.

The first to third embodiments illustrate the case where the wedges are formed by two-color molding and the case where the wedges are made of a single resin material. However, the present disclosure is not limited to this. The wedges may be formed by multi-color molding using three or more kinds of resins.

The first to third embodiments are described with respect to an example in which the plurality of wedges are inserted one by one into the wedge insertion grooves. However, the present disclosure is not limited to this. The plurality of wedges may be simultaneously inserted into the wedge insertion grooves.

The first to third embodiments are described with respect to an example in which the wedges with a bent shape are formed. However, the present disclosure is not limited to this. For example, wedges that do not have a bent shape may first be formed, and the wedges may then be inserted into the wedge insertion grooves while being thermally deformed into a bent shape, and may subsequently be placed in the wedge insertion grooves while being thermally deformed so that the bent shape is straightened.

The first to third embodiments are described with respect to an example in which the openings of the slots are formed on the inner side in the radial direction (an example in which the present disclosure is applied to an inner rotor type rotating electrical machine). However, the present disclosure is not limited to this. For example, an outer rotor type rotating electrical machine may be formed with the openings of the slots formed so as to open radially outward. In this case, each wedge is moved from the outer side in the radial direction toward the inner side in the radial direction and inserted into the slot.

The first to third embodiments are described with respect to an example in which the wedges are configured so that the wedge closes the entire opening of the slot when placed in the slot. However, the present disclosure is not limited to this. The wedge needs only to close at least a part of the opening. For example, an axial hole may be formed in a part of the deformation portion of the wedge, and the wedge may close a part of the opening so that the coil can be seen when viewed from one side in the radial direction through the hole.

The invention claimed is:

1. A stator, comprising:
an annular stator core having a plurality of slots each having a coil insertion opening that opens in a radial direction, and recesses formed in circumferential side walls and extending in an axial direction;
a coil including slot accommodated portions accommodated in the plurality of slots; and
a wedge containing a thermoplastic resin and engaged with the recesses so as to close at least a part of the coil insertion opening as viewed in the radial direction of the stator core, wherein:
the wedge includes a pair of engaging portions formed near both ends of the wedge in a circumferential direction of the stator core and engaged with the recesses, and a thermally deformable deformation portion formed in a middle of the wedge in the circumferential direction of the stator core,
the wedge is formed so that outer peripheral surfaces of the pair of engaging portions have an arc shape as viewed from one side in the axial direction of the stator core such that a width of the wedge in the circumferential direction at a radially outer portion is greater than a width of the wedge in the circumferential direction at the radially inner portion.

2. The stator according to claim 1, wherein
in the radial direction of the stator core, a radial thickness of the deformation portion is smaller than that of the pair of engaging portions.

3. The stator according to claim 1, wherein
the wedge is formed integrally by a first resin forming the deformation portion and a second resin forming the pair of engaging portions and containing a magnetic material.

4. The stator according to claim 1, further comprising:
a connection that is placed on one side in the axial direction of the stator core and connects a plurality of the wedges to each other in a circumferential direction of the stator core.

5. A method for manufacturing a stator including an annular stator core having a plurality of slots each having a coil insertion opening that opens in a radial direction, and recesses formed in circumferential side walls and extending in an axial direction, a coil including slot accommodated portions accommodated in the plurality of slots, and a wedge placed in the recesses, comprising the steps of:
inserting the slot accommodated portions of the coil into the plurality of slots through the coil insertion openings in the radial direction of the stator core; and
after the step of inserting the coil, moving the wedge containing a thermoplastic resin from one side in the radial direction of the stator core toward the other side in the radial direction through the coil insertion opening while thermally deforming the wedge, thereby engaging the wedge with the recesses so that the wedge closes at least a part of the coil insertion opening as viewed in the radial direction of the stator core.

6. The method for manufacturing a stator according to claim 5, further comprising the step of:

prior to the step of placing the wedge in the recesses, forming the wedge having a first circumferential width smaller than a circumferential width of the coil insertion opening in a circumferential direction of the stator core, wherein the step of engaging the wedge with the recesses is the step of disposing the wedge so that a lateral direction of the wedge extends in the circumferential direction of the stator core, and engaging the wedge with the recesses while thermally deforming the wedge so that a circumferential width of the wedge changes from the first circumferential width to a second circumferential width larger than the circumferential width of the coil insertion opening.

7. The method for manufacturing a stator according to claim 6, wherein the step of forming the wedge is the step of forming the wedge which includes a pair of engaging portions to be engaged with the recesses and a thermally deformable deformation portion formed between the pair of engaging portions and in which the pair of engaging portions and the deformation portion form a bent shape, and the step of engaging the wedge with the recesses is the step of engaging the wedge with the recesses by moving the wedge toward the other side in the radial direction while thermally deforming the wedge so that the pair of engaging portions of the wedge disposed on the one side in the radial direction of the stator core so as to have the bent shape as viewed from one side in the axial direction of the stator core moves outward in the circumferential direction of the stator core.

8. The method for manufacturing a stator according to claim 7, wherein the step of engaging the wedge with the recesses is the step of heating and pressing the wedge from the one side in the radial direction of the stator core so that the pair of engaging portions is guided into the recesses by the coil, thereby engaging the wedge with the recesses so that the pair of engaging portions is engaged with the recesses.

9. The method for manufacturing a stator according to claim 7, wherein the step of engaging the wedge with the recesses is the step of heating and pressing from the one side in the radial direction of the stator core the deformation portion of the wedge having the bent shape and disposed so that the deformation portion protrudes toward the one side in the radial direction of the stator core, thereby engaging the wedge with the recesses while thermally deforming the deformation portion so that the pair of engaging portions of the wedge moves outward in the circumferential direction of the stator core.

10. The method for manufacturing a stator according to claim 7, further comprising the step of:

after the step of engaging the wedge with the recesses, completing the heating of the wedge, thereby fixing a shape of the wedge having the pair of engaging portions engaged with the recesses.

* * * * *